(12) United States Patent
Whalen et al.

(10) Patent No.: US 11,236,023 B2
(45) Date of Patent: Feb. 1, 2022

(54) METHOD OF FORMING A PROTECTIVE COATING ON A SURFACE OF A CERAMIC SUBSTRATE

(71) Applicant: HONEYWELL INTERNATIONAL INC., Morris Plains, NJ (US)

(72) Inventors: Terence Whalen, Morristown, NJ (US); Bahram Jadidian, Watchung, NJ (US); Reza Oboodi, Morris Plains, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 529 days.

(21) Appl. No.: 16/183,276

(22) Filed: Nov. 7, 2018

(65) Prior Publication Data

US 2020/0140345 A1 May 7, 2020

(51) Int. Cl.
*C04B 41/50* (2006.01)
*C03C 8/02* (2006.01)
(Continued)

(52) U.S. Cl.
CPC ............ *C04B 41/5022* (2013.01); *C03C 8/02* (2013.01); *C03C 8/16* (2013.01); *C04B 41/4523* (2013.01); *C04B 41/522* (2013.01); *C04B 41/5353* (2013.01); *C04B 41/86* (2013.01); *C04B 41/89* (2013.01); *C04B 41/91* (2013.01); *C03C 2209/00* (2013.01)

(58) Field of Classification Search
CPC .. C03C 8/02; C03C 8/22; C04B 41/86; C04B 41/91
See application file for complete search history.

(56) References Cited

U.S. PATENT DOCUMENTS 3,993,844 A * 11/1976 Kiger .................. C04B 35/50
428/428
6,576,354 B2 6/2003 Tsukatani et al.
(Continued)

FOREIGN PATENT DOCUMENTS

| WO | 2018083174 A1 | 5/2018 | |
|---|---|---|---|
| WO | 2018093191 A1 | 5/2018 | |
| WO | WO-2018093191 A1 * | 5/2018 | ............... C03C 8/02 |

OTHER PUBLICATIONS

MT of WO 2018093191, no date.*
(Continued)

*Primary Examiner* — Alex A Rolland
(74) *Attorney, Agent, or Firm* — Lorenz & Kopf, LLP

(57) ABSTRACT

A method for forming a protective coating on a surface of a ceramic substrate includes combining a rare-earth oxide, alumina, and silica to form a powder, etching the surface of the ceramic substrate, applying the powder on the etched surface in an amount of from about 0.001 to about 0.1 g/cm² to reduce capture of bubbles from off-gassing of the ceramic substrate, heating the powder for a time of from about 5 to about 60 minutes to a temperature at or above the melting point such that the powder melts and forms a molten coating on the surface that has a minimized number of bubbles, and cooling the molten coating to ambient temperature to form the protective coating disposed on and in direct contact with the surface of the ceramic substrate such that the protective coating has a thickness of less than about 1 mil.

20 Claims, 3 Drawing Sheets

(51) Int. Cl.
*C03C 8/16* (2006.01)
*C04B 41/45* (2006.01)
*C04B 41/52* (2006.01)
*C04B 41/53* (2006.01)
*C04B 41/86* (2006.01)
*C04B 41/89* (2006.01)
*C04B 41/91* (2006.01)

(56) References Cited

U.S. PATENT DOCUMENTS

| | | |
|---|---|---|
| 8,940,417 B2 | 1/2015 | Courcot et al. |
| 2004/0148966 A1* | 8/2004 | Celikkaya ............. C03B 19/102 65/17.4 |
| 2009/0202735 A1* | 8/2009 | Marlin .................... C23C 4/134 427/452 |
| 2010/0129636 A1 | 5/2010 | Cybulsky et al. |
| 2015/0267058 A1* | 9/2015 | Lee ..................... C04B 41/5024 428/335 |
| 2016/0145159 A1 | 5/2016 | Landwehr et al. |
| 2016/0340232 A1* | 11/2016 | Mitra ...................... C03C 3/093 |
| 2017/0073277 A1 | 3/2017 | Shim et al. |
| 2017/0121232 A1* | 5/2017 | Nelson .................. C04B 41/009 |

OTHER PUBLICATIONS

Garcia et al., Superior Performance of Ablative Glass Coatings Containing Graphene Nanosheets, Journal of The American Ceramic Society, Aug. 29, 2016, pp. 4066-4072, vol. 99—No. 12, Institute of Ceramics and Glass, Madrid, Spain.

* cited by examiner

METHOD OF FORMING A PROTECTIVE COATING ON A SURFACE OF A CERAMIC SUBSTRATE

STATEMENT REGARDING FEDERALLY SPONSORED RESEARCH OR DEVELOPMENT

This invention was made with Government support under W58RGZ-16-C-0046 awarded by the PEO Aviation Improved Turbine Engine (ITE)/Future Vertical Lift (FVL) Project Office of the Department of the United States Army. The Government has certain rights in this invention.

TECHNICAL FIELD

The present disclosure generally relates to method of forming a protective coating on a surface of a ceramic substrate to form an article. More specifically, this disclosure relates to etching a surface of the ceramic substrate and heating a powder of a rare-earth oxide, alumina, and silica thereon to a temperature at or above the melting point such that the powder melts and forms a molten coating on the surface of the ceramic substrate that has a minimized number of bubbles from the off-gassing of the ceramic substrate.

BACKGROUND

Ceramic materials are currently being employed for high temperature components of gas turbine engines such as, for instance, airfoils (e.g., blades and vanes), combustor liners and shrouds. Current and next generation higher efficiency gas turbine engines will operate at higher temperatures, especially in the high pressure turbine section. Conventional superalloy components are already designed to and used to their near maximum acceptable temperature. Ceramics are suitable candidates for use in these increasingly stringent operating conditions. These materials maintain good strength at elevated temperatures and, due to their lower densities, lighter weight parts can be fabricated as compared to analogous metallic components.

Monolithic and composite structures have been under development for years. However, although ceramic materials exhibit desirable high temperature characteristics, exposed surfaces tend to erode in combustion environments due to air or steam rapidly passing over wherein water vapor becomes a reactive species and causes the erosion. This erosion is known as "recession" and can quickly reduce engine efficiency. More specifically, high temperatures and pressures in gas turbine engines as well as the high gas velocity can cause erosion of the ceramic materials. The mechanism of some of the erosion is thought to be due to the formation of $SiO_2$. Typically, combustion gas environments, including gas turbine engines, contain about 10% water vapor. Oxygen containing water in the gas turbine engine reacts with silicon nitride and silicon carbide to form silica scale on the ceramic materials. Water vapor can also react with the silica scale to form silicon hydroxide, which is volatile. Evaporation of silicon hydroxide from the ceramic materials due to high heat and erosion of ceramic caused by high speed combustion gases passing over the ceramic materials leads to the loss of ceramic material at rates of a few microns per hour.

In addition, fuel costs are a major cost of operation such that gains in engine efficiency can lead to significant cost savings. In order to minimize recession and erosion, protective coatings can be applied to the exposed surfaces of the ceramic materials. Protective coatings can serve as a thermal barrier between the combustion gases and the ceramic materials. More specifically, protective coatings for both monolithic and ceramic composites can be used to meet component life requirements. Unlike the protective thermal barrier coatings for superalloys, which are typically comprised of a Ni-aluminide bond coat and stabilized zirconia topcoat, and whose primary function is provide thermal protection to the alloy, the coatings for ceramics tend to be multilayered and primarily serve to minimize substrate recession by protecting the ceramic from oxidative and corrosive elements.

Many coatings rely on metalloid bondcoats (especially Si) to bond the coating system to the substrate. In the event of water and oxygen ingress, these bondcoats readily oxidize and lead to topcoat cracking, spallation and eventual failure.

Accordingly, it is desirable to develop an improved protective coating for ceramic articles. Furthermore, other desirable features and characteristics of the present disclosure will become apparent from the subsequent detailed description of the disclosure and the appended claims, taken in conjunction with the accompanying drawings and this background.

SUMMARY OF THE DISCLOSURE

This disclosure provides a method for forming a protective coating on a surface of a ceramic substrate. The method includes the steps of providing a powder comprising a rare-earth oxide, alumina, and silica and having a melting point and etching the surface of the ceramic substrate. The method also includes the step of applying the powder on the etched surface of the ceramic substrate in an amount of from about 0.001 to about 0.1 $g/cm^2$ to reduce capture of bubbles from off-gassing of the ceramic substrate. The method further includes the step of heating the powder on the surface of the ceramic substrate for a time of from about 5 to about 60 minutes to a temperature at or above the melting point such that the powder melts and forms a molten coating on the surface of the ceramic substrate that has a minimized number of bubbles from the off-gassing of the ceramic substrate. The method also includes the step of cooling the molten coating to ambient temperature to form the protective coating disposed on and in direct contact with the surface of the ceramic substrate. In this method, the protective coating has a thickness of less than about 1 mil and there is no layer disposed between the protective coating and the surface of the ceramic substrate.

BRIEF DESCRIPTION OF THE DRAWINGS

The present disclosure will hereinafter be described in conjunction with the following drawing figures, wherein like numerals denote like elements.

DETAILED DESCRIPTION

Figure 1:
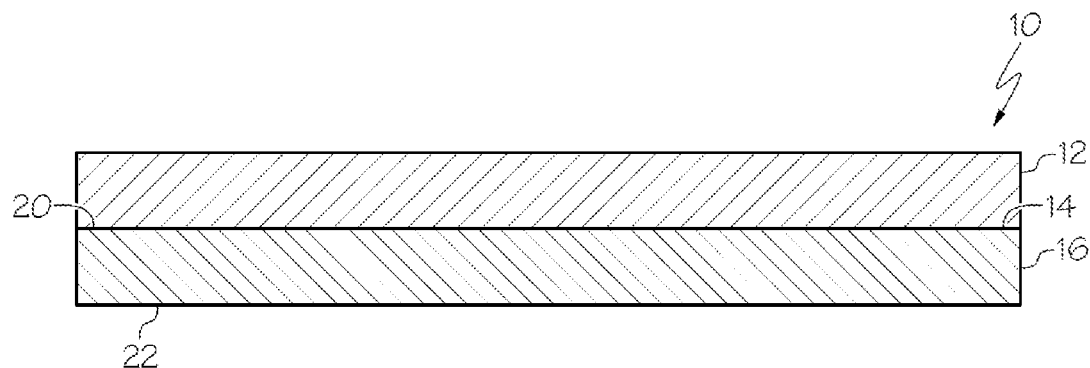
FIG. 1 is a first side cross-sectional view of one embodiment of this disclosure including a protective coating disposed on and in direct contact with a surface of a ceramic substrate wherein there is no layer, such as a bondcoat, disposed therebetween, e.g. similar to the Articles of this Disclosure of the Examples.

The following detailed description is merely exemplary in nature and is not intended to limit the disclosure. Furthermore, there is no intention to be bound by any theory presented in the preceding background or the following detailed description.

Embodiments of the present disclosure are generally directed to methods of disposing protective coatings on ceramic substrates and articles formed therefrom. For the sake of brevity, conventional techniques related thereto may not be described in detail herein. Moreover, the various tasks and process steps described herein may be incorporated into a more comprehensive procedure or process having additional steps or functionality not described in detail herein. In particular, various steps in the manufacture of such articles are well-known and so, in the interest of brevity, many conventional steps will only be mentioned briefly herein or will be omitted entirely without providing the well-known process details.

Article:

This disclosure provides an article 10 and a method of forming the article 10. Various non-limiting embodiments of the article 10 are shown in FIGS. 1-4. The article 10 itself is not particularly limited. In various embodiments, the article 10 is any portion of a vehicle, aircraft, ship, train, etc. In another embodiment, the article 10 is any portion of an aerospace vehicle, engine, or application. Alternatively, the article 10 may be any portion of an engine, e.g. a gas turbine engine, such as an aircraft engine. Non-limiting examples of such articles 10 include airfoils (e.g., blades and vanes), combustor liners, and shrouds. Alternatively, the article 10 may be any portion of an engine for a vehicle, ship, train, etc. Alternatively, the article 10 may be used in any industry including, but not limited to, the automobile industry, the aerospace industry, transportation industry, etc. Even further, the article 10 may be an article used in any high temperature and/or pressure environment including, but not limited to, power plants, mining, petroleum and oil refining, fracking, under water applications, deep sea applications, etc. In one embodiment, the article 10 is a gas turbine engine component. In another embodiment, the article 10 is a monolithic shroud.

The article 10 includes a ceramic substrate 16. The ceramic substrate 16 may include or be a monolithic ceramic or a ceramic matrix composite. A ceramic is an inorganic solid that may include metals, non-metals, or metalloid atoms primarily held together with ionic and/or covalent bonds. Ceramics may be crystalline, semi-crystalline, partially crystalline, or amorphous. The ceramic substrate 16 may include ceramic material throughout, such that the substrate is essentially 100 percent ceramic. Alternatively, the ceramic substrate 16 may be defined as a substrate that includes a ceramic coating disposed over a metal core.

The ceramic substrate 16 is not particularly limited in size, dimensions, etc. The ceramic substrate 16 may be or include any ceramic known in the art. For example, the ceramic substrate 16 may be or include silicon nitride, silicon carbide, silicon-carbide-silicon carbide composites, silicon oxynitride, SiAlON materials (materials that include silicon, aluminum, oxygen, and nitrogen), silicon dioxide, and combinations thereof. In other embodiments, the ceramic substrate 16 may be or include silicon nitride, silicon carbide, silicon-carbide-silicon carbide composites, or combinations thereof. In various embodiments, the ceramic substrate 16 may be or include from about 50 to about 100 weight percent, or from about 80 to about 100 weight percent, or from about 99 to about 100 weight percent of silicon nitride, silicon carbide, silicon oxynitride, SiAlON materials (materials that include silicon, aluminum, oxygen, and nitrogen), silicon dioxide, and combinations thereof. In various non-limiting embodiments, all values and ranges of values including and between those set forth above are hereby expressly contemplated for use herein.

The ceramic substrate 16 has a surface 14, which may be defined as a top or bottom surface of the substrate 16. The surface 14 is textured. The surface 14 typically includes the texture disposed therein. Alternatively, the surface 14 may be described as having texture disposed "thereon." The texture is not particularly limited in size, e.g. diameter or depth. In various embodiments, the texture has a depth of from greater than zero up to about 50 micrometers, e.g. from about 1 to about 50, about 5 to about 45, about 10 to about 40, about 15 to about 35, about 20 to about 30, or about 25 to about 30, micrometers. The texture may be formed using any method known in the art. For example, the texture may be formed by etching, as described in greater detail below, which typically removes material between grains/particles of the ceramic substrate 16. In various non-limiting embodiments, all values and ranges of values including and between those set forth above are hereby expressly contemplated for use herein.

The article 10 also includes a protective coating 12 disposed on the surface 14 of the ceramic substrate 16, as shown in FIGS. 1-4. The protective coating 12 is described in greater detail below. Typically, the protective coating 12 is disposed on and in direct contact with the surface 14 of the ceramic substrate 16 such that there is no layer disposed in between. For example, typically, there is no layer, such as a bondcoat, disposed in between the protective coating 12 and the surface 14 of the ceramic substrate 16.

Figure 2:
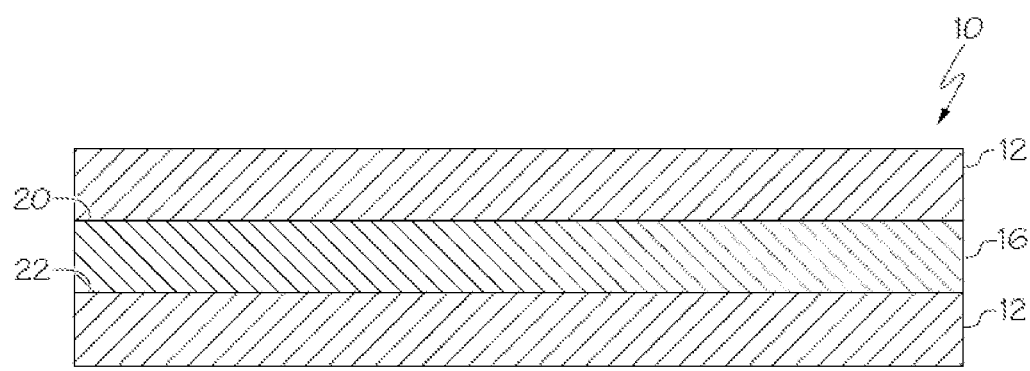
FIG. 2 is a second side cross-sectional view of one embodiment of this disclosure including a protective coating disposed on and in direct contact with a first surface of a ceramic substrate and a second surface of the ceramic substrate, wherein there is no layer, such as a bond layer, disposed between the protective coating and the first surface or the protective coating and the second surface.
Figure 3:
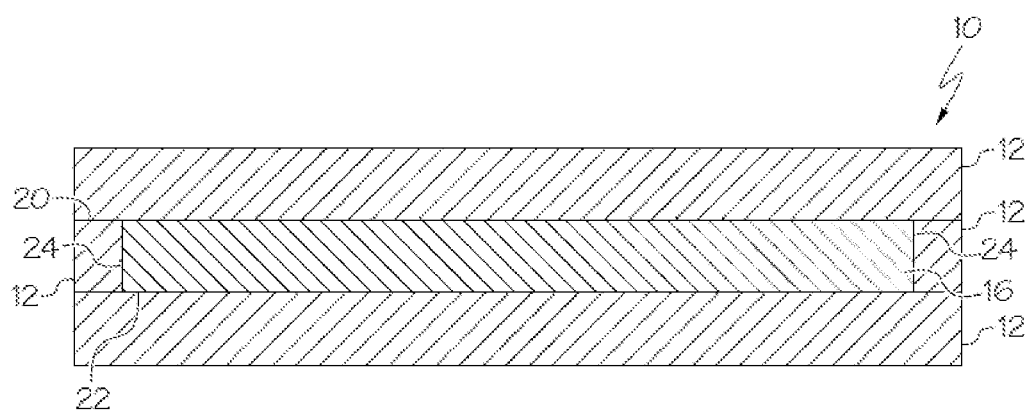
FIG. 3 is a third side cross-sectional view of one embodiment of this disclosure including a protective coating disposed on and in direct contact with a first surface of a ceramic substrate and a second surface of the ceramic substrate, and also on and in direct contact with edges of the ceramic substrate, wherein there is no layer, such as a bondcoat, disposed between the protective coating and the first surface or the protective coating and the second surface or the protective coating and the edges of the ceramic substrate.

The protective coating 12 may be described as an outermost layer of the article 10, e.g. as shown in FIGS. 1-3. In other words, the protective coating 12 may be an exterior layer of the article 10 with no additional layer disposed on top of it. As such, the protective coating 12 may be exposed to the environment. Similarly, the ceramic substrate 16 may be described as a second outermost layer of the article 10, e.g. disposed opposite the protective coating 12, as shown in FIG. 1. The ceramic substrate 16 typically has a first side 20 that is in direct contact with the protective coating 12 and, as such, is not exposed to the environment. At the same time, the ceramic substrate 16 typically has a second side 22, disposed opposite the first side 20. This second side 22 can be described as the second outermost layer of the article 10 because it is also exposed to the environment. In such a configuration, both the protective coating 12 and the ceramic substrate 16 are exposed to the environment as "top" and "bottom" layers of the article 10, respectively. An example of such a configuration is shown in FIG. 1.

Figure 4:
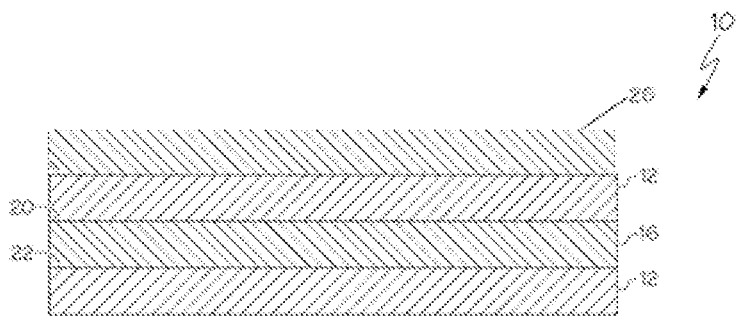
FIG. 4 is a fourth side cross-sectional view of one embodiment of this disclosure including a barrier coating disposed on an in direct contact with the protective coating wherein the protective coating is disposed on and in direct contact with a first surface of a ceramic substrate and a second surface of the ceramic substrate, wherein there is no layer, such as a bond layer, disposed between the protective coating and the first surface or the protective coating and the second surface.

In other embodiments, the protective coating 12 is disposed on both the first side 20 and the second side 22 of the ceramic substrate 16, e.g. as shown in FIGS. 2-4. In such a configuration, a first protective coating 12 and a second protective coating 12 may sandwich the ceramic substrate 16 therebetween. In such a configuration, there is also typically no layer or bondcoat disposed between the protective coating 12 and the second side 22 of the ceramic substrate 16. Again, in such a configuration, the protective coating 12 is typically disposed on and in direct contact with the second side 22 of the ceramic substrate 16.

Even further, the protective coating 12 may be disposed on one or more edges 24 of the ceramic substrate 16, e.g. as shown in FIG. 3. The protective coating 12 may be disposed on or more of the edges 24 of the ceramic substrate 16 and may or may not be disposed on the second side 22 of the ceramic substrate 16. Just as above, in such a configuration, there is typically no layer or bondcoat disposed between the protective coating 12 and the edges 24 of the ceramic substrate 16. In such a configuration, the protective coating 12 is typically disposed on and in direct contact with the edges 24 of the ceramic substrate 16. In any of the aforementioned embodiments, the protective coating 12 disposed on the first surface 20, the protective coating 12 disposed on the second surface 22, and/or the protective coating 12 disposed on the edges 24, may be the same as each other or may be different. Typically, each protective coating 12 would be the same and would each be applied using the formation method described herein.

It is also contemplated that the article 10 may include a barrier coating 26 disposed on the protective coating 12, e.g. as shown in FIG. 4. In such an embodiment, the protective coating 12 is not an outermost layer of the article 10. In such an embodiment, the barrier coating 26 typically sandwiches the protective coating 12 between the barrier coating 26 and the surface 14 of the ceramic substrate 16. In such an embodiment, the barrier coating 26 is typically disposed on and in direct contact with the protective coating 12 without any layer or bondcoat disposed therebetween. However, a layer and/or a bondcoat may be utilized and disposed therebetween. The barrier coating 26 may also be an outermost layer and is described in greater detail below.

Protective Coating:

The protective coating 12 is formed from a powder that may be, include, consist essentially of, or consist of, a rare-earth oxide, alumina, and silica. The terminology "consist essentially of" may describe various embodiments wherein the protective coating 12 is free of, or includes less than 5, 4, 3, 2, 1, 0.5, or 0.1, weight percent of, a binder, a non-rare earth oxide, inorganic compounds including any one or more described below that is not a rare earth oxide, and/or organic compounds, and the like. Similarly, the protective coating 12 may include a single rare-earth oxide to the exclusion of other rare-earth oxides. In various non-limiting embodiments, all values and ranges of values including and between those set forth above are hereby expressly contemplated for use herein.

In various embodiments, the rare earth oxide may include or be at least one of Lu (lutetium), Yb (ytterbium), Tm (thulium), Er (erbium), Ho (holmium), Dy (dysprosium), Tb (terbium), Gd (gadolinium), Eu (europium), Sm (samarium), Pm (promethium), Nd (neodymium), Pr (praseodymium), Ce (cerium), La (lanthanum), Y (yttrium), or Sc (scandium). In some examples, the at least one rare earth element is Yb. In various embodiments, the rare earth oxide is or includes Yttrium oxide ($Y_2O_3$), Lanthanum oxide ($La_2O_3$), Cerium oxide ($CeO_2$), Praseodymium oxide ($Pr_6O_{11}$), Neodymium oxide ($Nd_2O_3$), Samarium oxide ($Sm_2O_3$), Europium oxide ($Eu_2O_3$), Gadolinium oxide ($Gd_2O_3$), Terbium oxide ($Tb_4O_7$), Dysprosium oxide ($Dy_2O_3$), Holmium oxide ($Ho_2O_3$), Erbium oxide ($Er_2O_3$), Ytterbium oxide ($Yb_2O_3$), Lutetium oxide ($Lu_2O_3$), Scandium oxide ($Sc_2O_3$), Thulium oxide ($Tm_2O_3$), or combinations thereof.

Relative to the alumina, it is well known in the art that alumina is also known as aluminum oxide and is a chemical compound of aluminum and oxygen with the chemical formula $Al_2O_3$. Relative to the silica, it is well known in the art that silica is also known as silicon dioxide, silicic acid or silicic acid anhydride, and is an oxide of silicon with the chemical formula $SiO_2$.

In various embodiments, the powder includes about 10 to about 16 mol % of ytterbium oxide, about 50 to about 55 mol % of the silica, and about 30 to about 35 mol % of the alumina, based on a total of the powder. In other embodiments, the powder includes about 5 to about 16 mol % of the rare earth oxide, about 48 to about 77 mol % of the silica, and about 16 to about 36 mol % of the alumina, based on a total of the powder. In still other embodiments, the ytterbium (or any of the rare-earth oxides) may be present in an amount of from about 1 to about 20, about 1 to about 5, about 5 to about 10, about 10 to about 15, about 5 to about 15, about 5 to about 20, about 10 to about 20, or about 15 to about 20, mol %, based on a total of the powder. In further embodiments, the silica may be present in an amount of from about 40 to about 80, about 40 to about 45, about 45 to about 50, about 50 to about 55, about 55 to about 60, about 45 to about 55, about 45 to about 60, about 50 to about 60, about 45 to about 80, about 45 to about 75, about 45 to about 70, about 45 to about 65, mol %, based on a total of the powder. In further embodiments, the alumina is present in an amount of from about 5 to about 40, about 10 to about 35, about 15 to about 30, about 20 to about 25, about 20 to about 40, mol %, based on a total of the powder. In various non-limiting embodiments, all values and ranges of values including and between those set forth above are hereby expressly contemplated for use herein.

The powder has a particle size that is not particularly limited. In various embodiments, the powder has an average particle size of less than or equal to about 5, 4, 3, 2, or 1, microns. Typically, powder size is determined using a particle size analyzer, which may be any known in the art, e.g. a Malvern Mastersizer 3000. In various embodiments, microscopy, sieving, sedimentation techniques, optical and electrical sensing, laser light scattering techniques, surface area measurement techniques, combinations thereof, etc. are used.

The protective coating 12 has a thickness of less than about 1 mil. In various embodiments, the protective coating 12 has a thickness of from about 0.05 to about 1, about 0.1 to about 0.9, about 0.2 to about 0.8, about 0.3 to about 0.7, about 0.4 to about 0.6, or about 0.5, mils. In other embodiments, the protective coating 12 has a thickness of less than about 0.9, 0.8, 0.7, 0.6, 0.5, 0.4, 0.3, 0.2, or 0.1, mils. In various non-limiting embodiments, all values and ranges of values including and between those set forth above are hereby expressly contemplated for use herein.

Barrier Coating:

The barrier coating 26 may be further defined as an environmental barrier coating (EBC) or a thermal barrier coating (TBC). The barrier coating 26 may include, be, consist essentially of, or consist of, a rare earth silicate. For example, the barrier coating 26 may include a binder, such as a polymeric binder, when first applied. However, after a step of debinding, the polymeric binder may be burned away such that the barrier coating 26 then no longer includes such a binder and is, consists essentially of, or consists of, the rare earth silicate. In other words, the composition of the barrier coating 26 may be different depending on which stage in the method it is evaluated. The terminology "consist essentially of" may describe various embodiments wherein the barrier coating 26 is free of, or includes less than 5, 4, 3, 2, 1, 0.5, or 0.1, weight percent of, a binder, a non-rare earth silicate, inorganic compounds including any one or more described below that is not a rare earth silicate, and/or organic compounds, and the like. Similarly, the barrier coating 26 may include a single rare earth silicate to the exclusion of other rare earth silicates. In various non-limiting embodiments, all values and ranges of values including and between those set forth above are hereby expressly contemplated for use herein.

The barrier coating 26 may be any known in the art. For example, the rare earth silicate may be or include at least one rare earth monosilicate (e.g. $RE_2SiO_5$, where RE is a rare earth element), at least one rare earth disilicate (e.g. $RE_2Si_2O_7$, where RE is a rare earth element), or combinations thereof. The rare earth element may include at least one of Lu (lutetium), Yb (ytterbium), Tm (thulium), Er (erbium), Ho (holmium), Dy (dysprosium), Tb (terbium), Gd (gadolinium), Eu (europium), Sm (samarium), Pm (promethium), Nd (neodymium), Pr (praseodymium), Ce (cerium), La (lanthanum), Y (yttrium), or Sc (scandium). In some examples, the at least one rare earth element is Yb. In various embodiments, the rare earth silicate is $Y_2SiO_5$, $Gd_2SiO_5$, $Er_2SiO_5$, $Yb_2SiO_5$, or $Lu_2SiO_5$, or combinations thereof.

In some examples, in addition to the at least one rare earth silicate, the barrier coating 26 may include at least one of a free rare earth oxide, an aluminosilicate, or an alkaline earth aluminosilicate. For example, the barrier coating 26 may include mullite, barium strontium aluminosilicate (BSAS), barium aluminosilicate (BAS), strontium aluminosilicate (SAS), at least one free rare earth oxide, or combinations thereof. In some examples, the barrier coating 26 may also include an additive. For example, the barrier coating 26 may include at least one of $TiO_2$, $Ta_2O_5$, $HfSiO_4$, an alkali metal oxide, or an alkali earth metal oxide. The additive may be added to the barrier coating 26 to modify one or more desired properties of the barrier coating 26.

In some examples, the barrier coating 26 may have a dense microstructure, a columnar microstructure, or a combination of dense and columnar microstructures. A dense microstructure may be more effective in preventing the infiltration of environmental contaminants, while a columnar microstructure may be more strain tolerant during thermal cycling. A combination of dense and columnar microstructures may be more effective in preventing the infiltration of environmental contaminants than a fully columnar microstructure while being more strain tolerant during thermal cycling than a fully dense microstructure. In some examples, an barrier coating 26 with a dense microstructure may have a porosity of less than about 20 vol. %, such as less than about 15 vol. %, less than 10 vol. %, or less than about 5 vol. %, where porosity is measured as a percentage of pore volume divided by total volume of the barrier coating 26. In various non-limiting embodiments, all values and ranges of values including and between those set forth above are hereby expressly contemplated for use herein.

The barrier coating 26 is not particularly limited in size, thickness, or other dimensions. In various embodiments, the barrier coating 26 has a thickness of from about 0.5 to about 20 mils after formation. In other embodiments, the barrier coating 26 has a thickness of about 1 to about 19, about 2 to about 18, about 3 to about 17, about 4 to about 16, about 5 to about 15, about 6 to about 14, about 7 to about 13, about 8 to about 12, about 9 to about 11, about 10, or about 5 to about 10, mils, after formation. Before formation, the barrier coating 26 may have the same or a different thickness, as determined by one of skill in the art. In addition to the above, the barrier coating 26 is not particularly limited relative to physical properties. Any barrier coating 26 known in the art that includes a rare earth silicate may be used herein. In various non-limiting embodiments, all values and ranges of values including and between those set forth above are hereby expressly contemplated for use herein.

Physical Properties:

In various embodiments, the article 10 exhibits a certain adhesion after steam testing. For example, any steam testing protocol known in the art can be used, e.g. using steam cycles of varying times, such as about 15, or about 30 or about 60 minutes per cycle. For example, the article 10 may be exposed to steam from anywhere from 1 hour to thousands of hours, e.g. 2000 or more hours, at any steam temperature. In various embodiments, steam temperatures of from about 100 to about 1500, about 300 to about 1400, about 400 to about 1300, about 500 to about 1200, about 600 to about 1100, about 700 to about 1000, or about 800 to about 900, degrees Celsius, may be used. Without intending to be bound by theory, it is believed that steam can attack any layer or bondcoat disposed between the protective coating 12 and the surface 14 of the ceramic substrate 16. In various embodiments, after steam exposure, the article 10 can be evaluated for adhesion of the protective coating 12 to the surface 14 of the ceramic substrate 16, e.g. using ASTM C633. In some embodiments, the article 10 exhibits an adhesion of the protective coating 12 to the surface 14 of the ceramic substrate 16 of greater than 100, 200, 300, 400, 500, 600, 700, 800, 900, 1000, 1100, 1200, 1300, 1400, 1500, or more, psi, e.g. after steam exposure as described above for 100, 200, 300, 400, 500, 600, 700, 800, 900, 1000, 1100, 1200, 1300, 1400, 1500, 1600, 1700, 1800, 1900, or 2000, hrs, or more. In various non-limiting embodiments, all values and ranges of values including and between those set forth above are hereby expressly contemplated for use herein.

Method of Forming the Article:

This disclosure also provides a method of forming the protective coating 12 on the surface 14 of the ceramic substrate 16 (e.g. thereby forming the article 10). The method includes the step of providing the powder including the rare-earth oxide, alumina, and silica. The step of providing may be further defined as combining the rare-earth oxide, the alumina, and the silica to form the powder. The rare-earth oxide, the alumina, and the silica may be combined in any order and in any amounts or portions to form the powder that is provided. The powder has a melting point. Typically, the melting point is from about 1400 to about 1600, from about 1450 to about 1550, or from about 1500 to about 1550, ° C. In various non-limiting embodiments, all values and ranges of values including and between those set forth above are hereby expressly contemplated for use herein.

The method also includes the step of etching the surface 14 of the ceramic substrate 16, e.g. to texture the surface 14. Additionally or alternatively, the step of etching may be used to roughen the surface and/or remove any heat treatment (e.g. a silica layer) disposed on the surface 14 of the ceramic substrate 16, as provided from the manufacturer. Typically, it is desirable that the surface 14 of the ceramic substrate 16 be as clean as possible without any layer or residue disposed thereon. The step of etching can help form such a surface 14. It is also contemplated that the step of etching may be used to etch the first side 20 and the second side 22 of the ceramic substrate 16. Moreover, the step of etching can be used to etch the edges 24 of the ceramic substrate 16.

The step of etching may be conducted using any method or compound known in the art which may be described as an etchant. In various embodiments, the step of etching is further defined as etching using an acid or a base or a combination thereof, etching using a molten alkaline- and/or alkaline-earth metal hydroxide, plasma etching, chloride etching, etching using hydrofluoric acid, etching using aqueous pressurized KOH, or combinations thereof. The step of etching may be conducted at any temperature as selected by one of skill in the art. In various embodiments, the step of etching is conducted at a temperature of from about 25° C. to about 1500° C., about 50° C. to about 1250° C., about 100° C. to about 1000° C., about 250° C. to about 750° C., about 250° C. to about 500° C., about 300° C. to about 450° C., about 150° C. to about 300° C., about 350° C. to about 400° C., about 375° C. to about 450° C., about 100° C. to about 300° C., about 150° C. to about 250° C., or about 200° C. to about 250° C. In other embodiments, the step of etching is conducted for a time of from about 1 to about 60, about 5 to about 55, about 10 to about 50, about 15 to about 45, about 20 to about 40, about 25 to about 35, about 30 to about 35, or about 1, 2, 3, 4, 5, 6, 7, 8, 9, 10, 11, 12, 13, 14, or 15, minutes. Moreover, the step of etching may be repeated once or more than once, as determined by one of skill in the art. In various non-limiting embodiments, all values and ranges of values including and between those set forth above are hereby expressly contemplated for use herein.

The method may also include a step subsequent to the step of etching, e.g. cleaning the ceramic substrate 16 to neutralize the etchant. For example, an acid may be used to neutralize a basic etchant and a base may be used to neutralize an acidic etchant. Any known neutralizing agent can be used herein.

The step of cleaning the ceramic substrate 16 and/or neutralizing the etchant is not particularly limited in duration, temperature, pressure, etc. and may be determined by one of skill in the art. For example, the step of cleaning may also include utilizing one or more steps of rinsing with hot water, use of sonicators or other cleaning devices, and use of various temperatures. In one embodiment, a 20 wt % acidic solution is used for the step of cleaning at a temperature of from about 125° F. to about 175° F. Moreover, the step of cleaning may include a step of spraying the ceramic substrate 16 with an alcohol, such as isopropanol, to remove any residual water prior to the next step of the method. In various non-limiting embodiments, all values and ranges of values including and between those set forth above are hereby expressly contemplated for use herein.

The method further includes the step of applying the powder on the etched surface of the ceramic substrate in an amount of from about 0.001 to about 0.1 g/cm$^2$ to reduce capture of bubbles from off-gassing of the ceramic substrate. In various embodiments, this amount is from about 0.001 to about 0.010, about 0.002 to about 0.008, about 0.004 to about 0.006, about 0.01 to about 0.1, about 0.02 to about 0.08, about 0.04 to about 0.06, or about 0.001 to about 0.05, g/cm$^2$. In various non-limiting embodiments, all values and ranges of values including and between those set forth above are hereby expressly contemplated for use herein.

The terminology "reduce capture of bubbles from off-gassing" typically describes minimization of bubbling in the eventual molten coating, as is described in detail below. As the ceramic substrate 16 is heated, portions volatilize/vaporize thereby forming a gas. This disclosure sets forth a variety of options above, some which are optimized, to minimize the capturing of this gas thereby minimizing any bubbles that form in the final article 10. Minimization/elimination of bubbles is highly desirable and increases structural stability, performance, and aesthetic qualities of the article 10.

Referring back, the method also includes the step of heating the powder on the surface 14 of the ceramic substrate 16 for a time of from about 5 to about 60 minutes to a temperature at or above the melting point such that the powder melts and forms a molten coating on the surface 14 of the ceramic substrate 16 that has a minimized number of bubbles from the off-gas sing of the ceramic substrate 16. The step of heating is not particularly limited and may be further defined as heating using a furnace, such as a sintering furnace, or any other method known in the art. The step of heating may be conducted in an oxygenated atmosphere or in an atmosphere of inert gas. The step of heating may include any one or more steps, components, or descriptions as are set forth below relative to formation of the barrier coating 26. The powder may be heated at or to any temperature that is above the melting point. Typically, the temperature is from about 5 to about 100° C. above the melting point. Moreover, the powder may be heated for any time from about 5 to about 60, about 10 to about 55, about 15 to about 50, about 20 to about 45, about 25 to about 40, or about 30 to about 35, minutes. In various non-limiting embodiments, all values and ranges of values including and between those set forth above are hereby expressly contemplated for use herein.

After heating and melting, the molten coating typically flows into texture on the surface 14 of the ceramic substrate 16. In addition, the terminology "minimized number of bubbles from the off-gassing of the ceramic substrate" typically describes that there are zero or a small or acceptable number, in the article 10, as determined visually and as understood by one of skill in the art. For example, in various embodiments, if bubble are macroscopic, e.g. visible by eye, then they may be quantified in number per sq in., e.g. less than 20, 15, 10, 5, 4, 3, 2, or 1. In other examples, macroscopic bubbles may not be visually observable but microscopic bubbles only apparent when viewed via SEM may be present. In still other embodiments, bubbles may not even be seen with SEM.

The method further includes the step of cooling the molten coating to ambient temperature to form the protective coating 12 disposed on and in direct contact with the surface 14 of the ceramic substrate 16. The step of cooling is also not particularly limited and may be further defined as cooling in an ambient atmosphere, cooling using refrigeration, fans, etc. Ambient temperature is typically described as room temperature, ±about 5 to 10, ° C.

Figure 5:
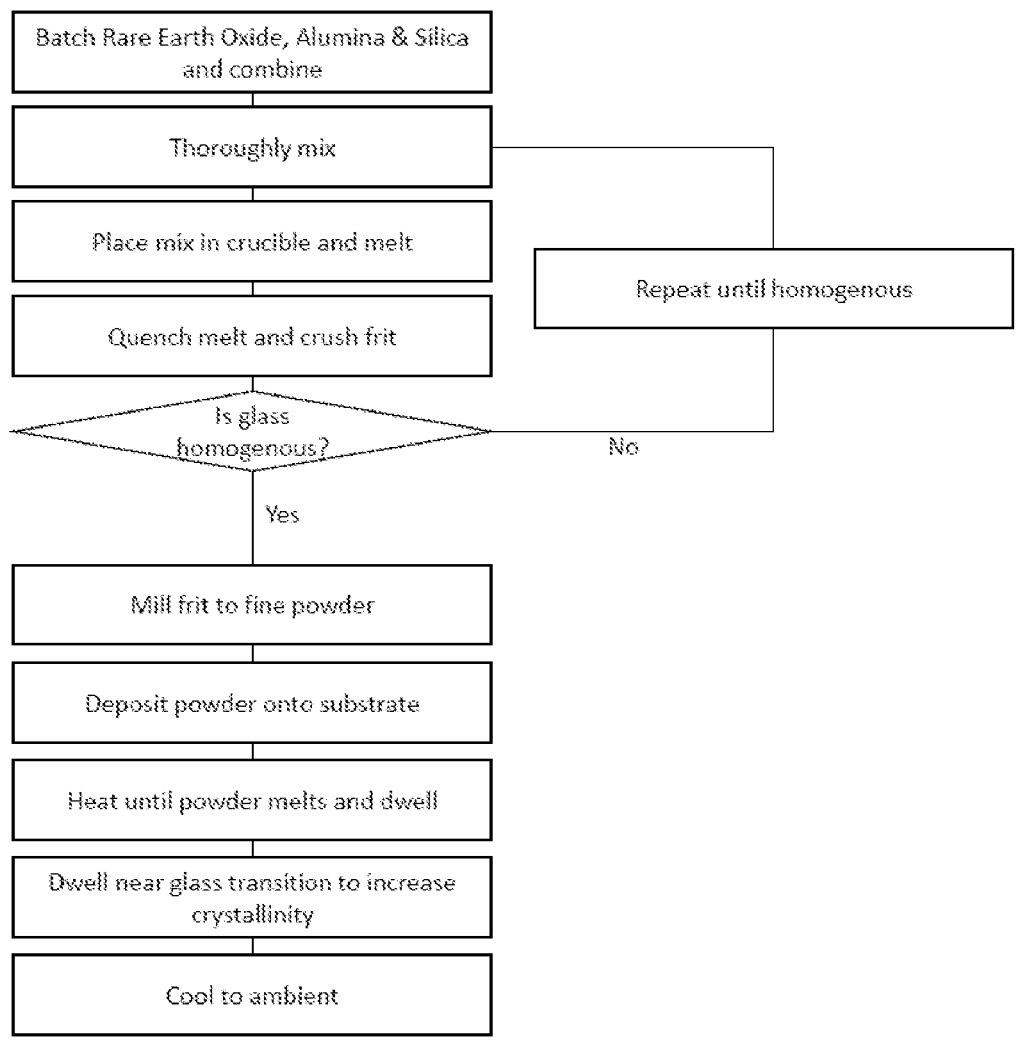
FIG. 5 is a first process schematic including various steps of one embodiment of this disclosure.

In various embodiments, the method includes the steps of melting the rare-earth oxide, alumina, and silica powder prior to the step of applying the powder on the etched surface 14, quenching the melt to form a frit, crushing the frit, and milling the frit to form an approximately homogeneous powder such that the step of applying the powder on the etched surface 14 is further defined as applying the homogeneous powder on the etched surface 14, e.g. as shown in FIG. 5. The steps of forming the frit, quenching, crushing, and milling may be chosen by one of skill in the art.

Figure 6:
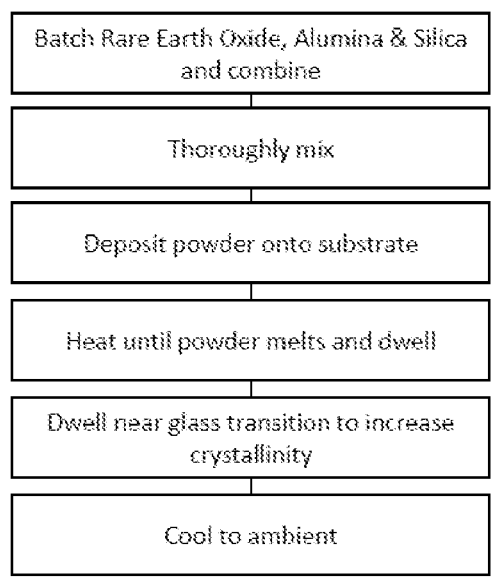
FIG. 6 is a second process schematic including various steps of one embodiment of this disclosure.

In another embodiment, the powder has a glass transition point and a glass softening point and the method further includes the step of annealing via maintaining a temperature of the molten coating between the glass transition point and the glass softening point (or e.g. near the glass transition temperature) to increase crystallinity, e.g. as shown in FIG. 6. The glass transition point and the softening point may also be any known in the art to be associated with the aforementioned powder. In one embodiment, the step of annealing is further defined as maintaining a temperature of the molten coating at about 900° C. for about 30 minutes such that after said step of cooling, the protective coating is about 50% crystallized and about 50% amorphous. This time may range from about 1 to about 60 minutes or any range of time therebetween. Moreover, the percentages of crystallized and amorphous nature of the coating may each range between about 1 and about 100%, or any value or range of values therebetween.

In still a further embodiment, the method includes disposing the powder in a solvent such that the step of applying the powder is further defined as applying a suspension of the powder in a solvent on the etched surface 14 of the ceramic substrate 16. In various embodiments, the step of applying is further defined as applying the powder via screen printing, tape casting, suspension dip, spraying, or slurry coating on the etched surface 14 of the ceramic substrate 16.

In an additional embodiment, the powder includes about 10 to about 16 mol % of ytterbium oxide, about 50 to about 55 mol % of the silica, and about 30 to about 35 mol % of the alumina, wherein about 5 wt % of the powder is combined with about 0.4 wt % acrylic binder, about 44.6 wt % alpha terpineol, and about 50 wt % isopropanol to form a suspension, wherein the step of applying the powder is further defined as applying the suspension, and wherein the protective coating has a thickness of about 0.0002 inches. Alternatively, the powder may be applied on the etched surface 14 of the ceramic substrate 16 in an amount of from about 0.001 to about 0.05 g/cm$^2$, wherein there is no layer or bondcoat disposed between the protective coating 12 and the surface 14 of the ceramic substrate 16, wherein the powder includes about 10 to about 16 mol % of ytterbium oxide, about 50 to about 55 mol % of the silica, and about 30 to about 35 mol % of the alumina, wherein about 5 wt % of the powder is combined with about 0.4 wt % acrylic binder, about 44.6 wt % alpha terpineol, and about 50 wt % isopropanol to form a suspension, wherein the step of applying the powder is further defined as applying the suspension, and wherein the protective coating has a thickness of about 0.0002 inches.

Additionally, the method may also include the step of disposing the barrier coating 26 on the protective coating 12. The barrier coating 26 may be disposed or applied to/on the protective coating 12 using any method known in the art. For example, the barrier coating 26 may be applied using a spray application, dip application, silkscreen application, blade application, or a combination thereof. The particular parameters of one or more of these application methods may be chosen by one of skill in the art.

The barrier coating 26 may be disposed on the protective coating 12 as a paint, paste, or slurry, or as an aqueous or non-aqueous solution with surfactants, binders, plasticizers, known in the ceramic, paint and paste industries, e.g. particles of the rare earth silicate disposed in a solvent such as an alcohol. The slurry may also include a binder, which may be any known in the art. For example, the binder may be a plastic.

After the barrier coating 26 is applied on/to the protective coating 12, the method may also include the step of drying the barrier coating 26, e.g. if the barrier coating 26 is wet or otherwise applied using a solvent or as a slurry. The step of drying is not particularly limited relative to time, temperature, or pressure and these parameters may be chosen by one of skill in the art. In various embodiments, the barrier coating 26 is dried at atmospheric pressure. However, a lower pressure, such as a vacuum pressure, may be used. The barrier coating 26 may be dried at room temperature or at an elevated temperature. In various embodiments, the barrier coating 26 may be dried at a temperature of from about 50° C. to about 200° C., about 100° C. to about 150° C., or about 125° C. to about 150° C., for a time of from 1 to 30 minutes. In various non-limiting embodiments, all values and ranges of values including and between those set forth above are hereby expressly contemplated for use herein.

The method may also include the optional step of debinding the barrier coating 26. The step of debinding may be described as removing (e.g. burning off) all or a portion of a binder that is present in the barrier coating 26. This binder is not required in the barrier coating 26 such that the step of debinding also is not required. The step of debinding is not particularly limited and may be any known in the art. The step of debinding is typically utilized before sintering in an inert or nitrogen atmosphere because oxygen is required for burn-off of the binder. If the binder is not removed before sintering in an inert atmosphere (e.g. helium, neon, argon, krypton, xenon or also using nitrogen), there will not be sufficient oxygen present to bind with the carbon of the binder to form carbon dioxide and burn-off the binder. Instead, residual carbon will be left in place after sintering. Typically, this is undesirable because the presence of carbon can affect the chemistry of the bonding of the barrier coating 26 to the protective coating 12 which could ultimately degrade physical properties of the article 10.

Moreover, the particular parameters of this debinding step may be chosen by one of skill in the art. In various embodiments, the step of debinding occurs at a temperature of from about 150° C. to about 750° C., about 350° C. to about 700° C., about 400° C. to about 650° C., about 450° C. to about 600° C., or about 500° C. to about 550° C. The step of debinding may be conducted for any time as chosen by one of skill in the art, e.g. about 10 to about 60, about 15 to about 55, about 20 to about 50, about 25 to about 45, about 30 to about 40, or about 35 to about 40, minutes. In various non-limiting embodiments, all values and ranges of values including and between those set forth above are hereby expressly contemplated for use herein.

The barrier coating 26 may be formed using any method known in the art, e.g. using an isostatic press (HIP) furnace. In a HIP unit, a high temperature furnace is typically enclosed in a pressure vessel. The temperature, pressure and process times are all controlled to achieve the optimum material properties. The specific parameters of the formation of the barrier coating 26 may be chosen by one of skill in the art. For example, an oxygenated atmosphere or an inert atmosphere including any noble gas and/or nitrogen may be used. The time and temperature and specific sintering profile may also be chosen by one of skill in the art.

In various embodiments, the sintering profile includes sintering at a temperature of from about 1400° C. to about 1700° C., about 1450° C. to about 1650° C., about 1400° C. to about 1600° C. about 1500° C. to about 1600° C., or about 1500° C. to about 1550° C. In other embodiments, the sintering profile includes sintering for a time of from about 1 to about 60, about 5 to about 55, about 10 to about 50, about 15 to about 45, about 20 to about 40, about 25 to about 35, or about 30 to about 35, minutes. In further embodiments, the sintering profile includes sintering using any inert gas such as a noble gas, e.g. helium, neon, argon, krypton, xenon, or nitrogen. In other embodiments, the sintering profile includes sintering at a pressure of from about 1 to about 30,000, about 100 to about 25,000, about 500 to about 20,000, about 1,000 to about 15,000, about 1,500 to about 10,000, about 2,000 to about 5,000, about 100 to about 1,000, about 200 to about 900, about 300 to about 800, about 400 to about 700, about 500 to about 600, about 10 to about 100, about 20 to about 100, about 25 to about 75, about 25 to about 50, about 50 to about 100, or about 75 to about 100, psi. In still other embodiments, any parameters that typically are used with a HIP furnace can be used herein. Moreover, any ramp-up of the temperature and/or pressure of the HIP furnace may be used. In various non-limiting embodiments, all values and ranges of values including and between those set forth above are hereby expressly contemplated for use herein. Any of the aforementioned steps, options, or parameters may be utilized in the step of heating the powder as is described above.

After formation, the article 10 may then be evaluated to determine various physical and chemical properties, e.g. as described above. Alternatively, the article 10 may then be used or may be subjected to further processing, as chosen by one of skill in the art.

EXAMPLES

A $YbO_3$—$SiO_2$—$Al_2O_3$ glass is formed by mixing the individual oxides at 15 mol %, 52 mol %, and 33 mol %, respectively, and placing the mixture into a crucible held at 1550° C. for 4 hours to melt the mixture. The resultant melted mixture is then quenched, crushed, re-mixed and heated again at 1550° C. for 4 additional hours to maximize homogeneity of the glass and form a frit. The frit is then comminuted to a fine glass powder. A thin, paintable suspension is then formed using 5 wt % of the fine glass powder combined with 0.4 wt % acrylic binder, 44.6 wt % alpha terpineol, and 50 wt % isopropanol. The suspension is then brushed onto a series of silicon nitride substrates in a thin uniform layer of approximately 0.0002 inch thickness. The suspension solvent is then dried at 80° C. and the remaining binder is burned out at 500° C. Subsequently, the coated silicon nitride substrates are heated to 1550° C. and held for 5 minutes to melt the fine glass powder, form a molten coating, and allow the molten coating to flow across the surface of the substrates. The temperature is then lowered to 900° C. and held for 30 minutes to crystallize about 50% of the molten coating. The substrates are then cooled to ambient temperature. This process forms protective coatings having a thickness of about 0.0002 inches that are free of bubbles, voids, and cracks, as determined visually. These substrates exhibit a reduced rate of mass loss when exposed to operating conditions.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A method for forming a protective coating on a surface of a ceramic substrate, said method comprising the steps of:
   providing a powder comprising a rare-earth oxide, alumina, and silica and having a melting point;
   etching the surface of the ceramic substrate,
   applying the powder on the etched surface of the ceramic substrate in an amount of from about 0.001 to about 0.1 $g/cm^2$ to reduce capture of bubbles from off-gassing of the ceramic substrate;
   heating the powder on the surface of the ceramic substrate for a time of from about 5 to about 60 minutes to a temperature at or above the melting point such that the powder melts and forms a molten coating on the surface of the ceramic substrate that has a minimized number of bubbles from the off-gassing of the ceramic substrate; and
   cooling the molten coating to ambient temperature to form the protective coating disposed on and in direct contact with the surface of the ceramic substrate,
   wherein the protective coating has a thickness of less than about 1 mil, and
   wherein there is no layer disposed between the protective coating and the surface of the ceramic substrate.

2. The method of claim 1 wherein the step of etching is chosen from the group of etching with an alkaline- and/or alkaline earth metal-hydroxide, chloride etching, plasma etching, etching with an acid, or combinations thereof.

3. The method of claim 1 wherein the powder is applied on the etched surface of the ceramic substrate in an amount of from about 0.001 to about 0.05 $g/cm^2$.

4. The method of claim 1 wherein the protective coating is further defined as an outermost layer exposed to the environment.

5. The method of claim 1 further comprising the step of disposing a barrier coating on and in direct contact with the protective coating sandwiching the protective coating between the barrier coating and the surface of the ceramic substrate.

6. The method of claim 1 wherein the protective coating has a thickness of less than about 0.5 mils.

7. The method of claim 1 further comprising the steps of melting the rare-earth oxide, alumina, and silica powder prior to the step of applying the powder on the etched surface, quenching the melt to form a frit, crushing the frit, and milling the frit to form an approximately homogeneous powder and wherein the step of applying the powder on the etched surface is further defined as applying the homogeneous powder on the etched surface.

8. The method of claim 1 wherein the powder has a glass transition point and a glass softening point and said method further comprises the step of annealing via maintaining a temperature of the molten coating between the glass transition point and the glass softening point to increase crystallinity.

9. The method of claim 8 wherein the step of annealing is further defined as maintaining a temperature of the molten coating at about 900° C. for about 30 minutes such that after said step of cooling, the protective coating is about 50% crystallized and about 50% amorphous.

10. The method of claim 1 wherein the step of heating the powder occurs in an oxygenated atmosphere.

11. The method of claim 1 wherein the step of heating the powder occurs in an inert gas atmosphere.

12. The method of claim 1 wherein the powder is disposed in a solvent such that said step of applying the powder is further defined as applying a suspension of the powder in a solvent on the etched surface of the ceramic substrate.

13. The method of claim 1 wherein the step of applying is further defined as applying the powder via screen printing, tape casting, suspension dip, spraying, or slurry coating on the etched surface of the ceramic substrate.

14. The method of claim 1 wherein the powder comprises about 10 to about 16 mol % of ytterbium oxide, about 50 to about 55 mol % of the silica, and about 30 to about 35 mol % of the alumina.

15. The method of claim 1 wherein the powder comprises about 5 to about 16 mol % of the rare earth oxide, about 48 to about 77 mol % of the silica, and about 16 to about 36 mol % of the alumina.

16. The method of claim 1 wherein the powder comprises about 10 to about 16 mol % of ytterbium oxide, about 50 to about 55 mol % of the silica, and about 30 to about 35 mol % of the alumina, wherein about 5 wt % of the powder is combined with about 0.4 wt % acrylic binder, about 44.6 wt % alpha terpineol, and about 50 wt % isopropanol to form a suspension, wherein the step of applying the powder is further defined as applying the suspension, and wherein the protective coating has a thickness of about 0.0002 inches.

17. The method of claim 1 wherein the powder has an average particle size of less than or equal to about 5 microns.

18. The method of claim 1 wherein the powder is applied on the etched surface of the ceramic substrate in an amount of from about 0.001 to about 0.05 $g/cm^2$, wherein the powder comprises about 10 to about 16 mol % of ytterbium oxide, about 50 to about 55 mol % of the silica, and about 30 to about 35 mol % of the alumina, wherein about 5 wt % of the powder is combined with about 0.4 wt % acrylic binder, about 44.6 wt % alpha terpineol, and about 50 wt % isopropanol to form a suspension, wherein the step of applying the powder is further defined as applying the suspension, and wherein the protective coating has a thickness of about 0.0002 inches.

19. The method of claim 18 wherein the powder has a glass transition point and a glass softening point and said method further comprises the step of annealing via maintaining a temperature of the molten coating between the glass transition point and the glass softening point to increase crystallinity, wherein said step of annealing is further defined as maintaining a temperature of the molten coating at about 900° C. for about 30 minutes such that after said step of cooling, the protective coating is about 50% crystallized and about 50% amorphous, and wherein said step of annealing occurs in an oxygenated atmosphere.

20. The method of claim 18 wherein the powder has a glass transition point and a glass softening point and said method further comprises the step of annealing via maintaining a temperature of the molten coating between the glass transition point and the glass softening point to increase crystallinity, wherein said step of annealing is further defined as maintaining a temperature of the molten coating at about 900° C. for about 30 minutes such that after said step of cooling, the protective coating is about 50% crystallized and about 50% amorphous, and wherein said step of annealing occurs in an inert gas atmosphere.

* * * * *